United States Patent [19]
Morikawa et al.

[11] Patent Number: 5,749,146
[45] Date of Patent: May 12, 1998

[54] SCISSORS TYPE STEEL SHEARING APPARATUS WITH POLYGONAL SHEARING BLADES

[75] Inventors: Sumio Morikawa; Toshiji Ohga; Masahiro Kondoh, all of Osaka, Japan

[73] Assignee: Ohyodo Diesel Co., Ltd., Osaka, Japan

[21] Appl. No.: 525,986

[22] Filed: Sep. 8, 1995

Related U.S. Application Data

[63] Continuation-in-part of Ser. No. 101,358, Aug. 3, 1993.

[30] Foreign Application Priority Data

Jun. 16, 1993 [JP] Japan ......................... 5-144448

[51] Int. Cl.⁶ ............................................. B25P 19/00
[52] U.S. Cl. .................................... 30/134; 83/928
[58] Field of Search ........................ 30/134, 132, 255, 30/254, 253; 83/346.57, 928; 241/101.73

[56] References Cited

U.S. PATENT DOCUMENTS 404,736   6/1889  Sanford ........................ 30/254
4,175,624 11/1979 van der Lely ................. 172/59
5,186,507  2/1993 Neidfeld ........................ 294/3.5

FOREIGN PATENT DOCUMENTS 0592722  4/1994  European Pat. Off. .
0629460 12/1994  European Pat. Off. .

Primary Examiner—Maurina T. Rachuba
Attorney, Agent, or Firm—Morrison Law Firm

[57] ABSTRACT

A shearing machine includes a generally hexagonal shearing blade and a generally rectangular shearing blade on each of an upper and a lower jaw. The hexagon forms a point at the forward end of the hexagonal shearing blade dividing a main shearing edge from an auxiliary shearing edge. A hexagonal edge at the rear of the hexagonal shearing blade forms a relief edge which unloads shearing forces to permit full shearing force to be directed to the rectangular shearing blade during a final stage of shearing a sheet of material. An end of the rectangle is preferably abutted to a portion of the relief edge, without provision for a gap or clearance therebetween. Embodiments are disclosed in which the shape of the shearing blade is non-hexagonal. In one disclosed embodiment, the shape of the shearing blade is non-polygonal, in that at least one edge is a curve.

4 Claims, 9 Drawing Sheets

FOUR SIDED

THREE SIDED SCALENE TRIANGLE $n$-SIDED

NON-POLYGONAL

FIVE SIDED

EIGHT SIDED 5,749,146

1

SCISSORS TYPE STEEL SHEARING APPARATUS WITH POLYGONAL SHEARING BLADES

This is a continuation-in-part of application Ser. No. 08/101,358 filed Aug. 3, 1993.

BACKGROUND OF THE INVENTION

This invention relates to a scissors type steel shearing machine mountable on a tip of an arm of a working machine, such as a power shovel, for shearing steel material such as, for example, bars and sheets.

Referring to FIG. 1, a power shovel 1, according to the prior art, includes a boom 50 articulated thereto. Boom 50 is rotatable in a vertical direction, while power shovel 1 is rotatable in a horizontal direction, both in a conventional manner. An arm 2 is articulated to the end of boom 50. A swivel joint 20 of a prior art steel shearing machine, shown generally at 3, is affixed at the end of arm 2.

Steel shearing machine 3 includes a lower jaw 4 and an upper jaw 5. A support shaft 6 pivotably connects a rear portion of upper jaw 5 to a rear portion of lower jaw 4. A frame 7 is rigidly affixed to lower jaw. Frame 7 extends upward past upper jaw 5. A hydraulic cylinder 10 is mounted between frame 7 and upper jaw 5. Extension and retraction of hydraulic cylinder 10 moves upper jaw 5, scissors fashion, toward and away from lower jaw 4.

Referring now also to FIG. 2, a lower shearing blade 11 is affixed to an upper edge of lower jaw 4. An upper shearing blade 12 is affixed to a lower edge of upper jaw 5. Shearing blade 12 is moved downward with upper jaw 5 by extension of hydraulic cylinder 10 into slidable shearing engagement with shearing blade 11 on lower jaw 4.

Lower shearing blade 11 is bent into a concave upward shape at an intermediate point 9. Similarly, upper shearing blade 12 is bent into a concave downward shape at an intermediate point 9. A longitudinal gap or clearance 21 exists between adjacent ends of upper leading shearing blade 16 and upper trailing shearing blade 17. A similar longitudinal gap or clearance exists between the shearing blades on lower jaw 4.

A piece of steel material 13, between lower jaw 4 and upper jaw 5 is cut when upper jaw 5 is moved downward, scissors fashion, past lower jaw 4. Due to the concave shapes of lower and upper shearing blades 11 and 12, steel material 13 is cut inward at its forward and rearward edges at the same time. The outward displacement of intermediate points 9 prevents slippage of steel material 13 while shearing. In addition, if an edge of steel material 13 is inward of the outer tips of lower and upper shearing blades 11 and 12, steel material 13 tends to slide inward between lower and upper jaws 4 and 5, thereby moving steel material 13 into a position where a greater shearing force can be exerted upon it.

Upper shearing blade 12 include an upper leading blade 16 and an upper trailing blade 17. Similarly, lower shearing blade 11 includes a lower leading blade 14 and a lower trailing blade 14.

Referring now to FIG. 2, as upper jaw 5 is pivoted downward, the angle between upper trailing blade 17 and lower trailing blade 15 decreases more and more. Initially, a substantial crossing angle between upper trailing blade 17 and lower trailing blade 15 facilitates scissors-fashion shearing. However, as the edges of upper trailing blade 17 approach closer and closer to being parallel to lower trailing

2 blade 15, as shown in dash-dot line in FIG. 2, a much greater force is required to shear steel material 13. When the shearing progresses inward from the rear of steel material 13 approaching intermediate points 9 the shearing force rises to a maximum.

Referring to FIGS. 2 and 3, one solution to some of the problems in the steel shearing machine 3 of FIG. 1 includes lower leading and trailing blades 14 and 15 attached end to end on lower jaw 4. Lower leading blade 14 and lower trailing blade 15 are angled with respect to each other in a V-shaped configuration. The shearing plane, as used herein is a plane formed by rotating a line about support shaft 6. The pivoting motion of upper jaw 5 is parallel to the shearing plane as thus described.

The angle of upper leading blade 16 with respect to upper trailing blade 17 is substantially equal to the corresponding angle between lower leading blade 14 and lower trailing blade 15.

It is noted that the longitudinally oppositely directed inclinations of the leading blades with respect to the trailing blades prevents the steel material 13 from slipping forward in the longitudinal direction. However, the problem of high shearing forces as the two trailing blades approach parallelism remains. This high shearing force is especially severe when attempting to cut through a sheet of steel material which is wider than the depth of upper and lower jaws 5 and 4. The maximum is reached when attempting to cut at intermediate point 9, where upper and lower trailing blades 15 and 17 are approaching parallel.

Jaw spreading is prevented by a transverse displacement of lower leading shearing blade 14 and upper leading shearing blade 16, so that the shearing plane of these two elements is on the opposite side as the shearing plane of the remaining elements. This arrangement produces spreading forces in opposite, offsetting directions, thereby preventing jaw spreading or what is called a mouth opening phenomenon.

Referring to FIGS. 4 through 7, the sequence performed in shearing steel material 13 by the prior-art device of FIG. 2 is illustrated. Blades positioned in front of the shearing plane (in a direction toward the reader) are shown in solid lines, and blades positioned behind the shearing plane are shown in dashed lines.

Referring to FIG. 4, before shearing begins, a sheet of steel material 13 is placed between upper and lower leading blades 16 and 14, and between upper and lower trailing blades 17 and 15. At this point sheet of steel material 13 rests on lower leading and trailing blades 14 and 15, with upper leading and trailing blades 16 and 17 both out of contact with steel material 13.

Referring to FIG. 5, as the upper jaw (not shown) is rotated about support shaft 6, a forward portion of steel material 13 is sheared by upper and lower leading blades 16 and 14. If steel material 13 has a significant width, its rear edge is sheared simultaneously by upper and lower trailing blades 17 and 15, as shown.

Referring now to FIG. 6, shearing proceeds inward from the forward edge until it reaches intermediate point 9. At this time, due to the much shallower angle, shearing at the rear has not advanced very far toward intermediate point 9. Thus, the substantially parallel condition of upper and lower trailing blades 17 and 15 reached at this time requires a very great amount of force to proceed. That is, the shearing force on steel material 13 is not concentrated at a point on the edges of upper and lower trailing blades 17 and 15, but is spread out over the edges of the blades which rest substantially flush with the surfaces of steel material 13. Accordingly, a hydraulic cylinder 10 of normal power is incapable of completing the cut across steel material 13.

Referring now to FIG. 8, the relationship between the jaw opening angle and the required shearing force is shown. At large jaw opening angles, shown to the right in the figure, the steep shearing angles, evident in FIG. 5, require modest shearing force. As the jaw opening angle is reduced (toward the left in the figure), the required shearing force increases substantially until a point 104 is reached which corresponds to the distributed force situation of FIG. 6. At point 104, the blade crossing angle is substantially zero, thus driving the required shearing force upward almost asymptotically to the force axis.

The problem of insufficient force from hydraulic cylinder 10 can be solved by a larger or more powerful hydraulic cylinder. In practice, this is very difficult since a larger cylinder requires greater mounting space and increased structure to support its weight. Even where space is available for a more powerful hydraulic cylinder, such a solution increases the cost.

OBJECTS AND SUMMARY OF THE INVENTION

It is an object of the invention to provide a steel shearing machine which overcomes the drawbacks of the prior art.

It is a further object of the invention to provide a steel shearing machine in which segmented upper and lower shearing blades engage a piece of steel material at different times so that efficient shearing is enabled throughout the closure of an upper jaw with respect to a lower jaw.

It is a still further object of the invention to provide a steel shearing machine which includes a vertical step between leading and trailing blades, whereby a time delay is provided between shearing at various longitudinal positions between upper and lower jaws.

It is a still further object of the invention to provide a shearing machine of relatively small size with a high shearing ability.

Briefly stated, the present invention provide a shearing machine that includes a generally hexagonal shearing blade and a generally rectangular shearing blade on each of an upper and a lower jaw. The hexagon forms a point at the forward end of the hexagonal shearing blade dividing a main shearing edge from an auxiliary shearing edge. A hexagonal edge at the rear of the hexagonal shearing blade forms a relief edge which unloads shearing forces to permit full shearing force to be directed to the rectangular shearing blade during a final stage of shearing a sheet of material. An end of the rectangle is preferably abutted to a portion of the relief edge, without provision for a gap or clearance therebetween. Embodiments are disclosed in which the shape of the shearing blade is non-hexagonal. In one disclosed embodiment, the shape of the shearing blade is non-polygonal, in that at least one edge is a curve.

According to an embodiment of the invention, there is provided a shearing apparatus comprising: an upper jaw, a first leading shearing blade on the upper jaw, a first trailing shearing blade on the upper jaw, the first leading shearing blade having a first outline, the first outline forming a first main shearing edge and a first auxiliary shearing edge at a forward end thereof, the first main shearing edge and the first auxiliary shearing edge forming a first angle therebetween, the first trailing shearing blade abutting a trailing end of the first outline, a lower jaw, a second leading shearing blade on the lower jaw, a second trailing shearing blade on the lower jaw, the second leading shearing blade having a second outline, the second outline forming a second main shearing edge and a second auxiliary shearing edge at a forward end thereof, the second main shearing edge and the second auxiliary shearing edge forming a second angle therebetween, the second trailing shearing blade abutting a trailing portion of the second outline, the first and second angles being greater than 90 degrees and, means for permitting rotation of at least one of the upper jaw and the lower jaw, whereby shearing engagement between shearing blades on the upper and lower jaws is enabled.

According to a feature of the invention, there is provided a shearing blade for a shearing apparatus comprising: a main shearing edge, an auxiliary shearing edge adjacent a first end of the main shearing edge, the main shearing edge and the auxiliary shearing edge defining a first included angle therebetween, the first included angle being greater than 90 degrees, a relief edge adjacent a second end of the main shearing edge, the relief edge and the main shearing edge defining a second included angle therebetween and, the second included angle being greater than 90 degrees.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 10b is a perspective view of a sheet of material in the condition created by the progress of shearing in FIG. 10a.

FIG. 11b is a perspective view of the sheet of material as sheared in FIG. 11a.

FIG. 12b is a perspective view of the sheared sheet of material as sheared in FIG. 12a.

DETAILED DESCRIPTION OF THE PREFERRED EMBODIMENTS

Figure 1:
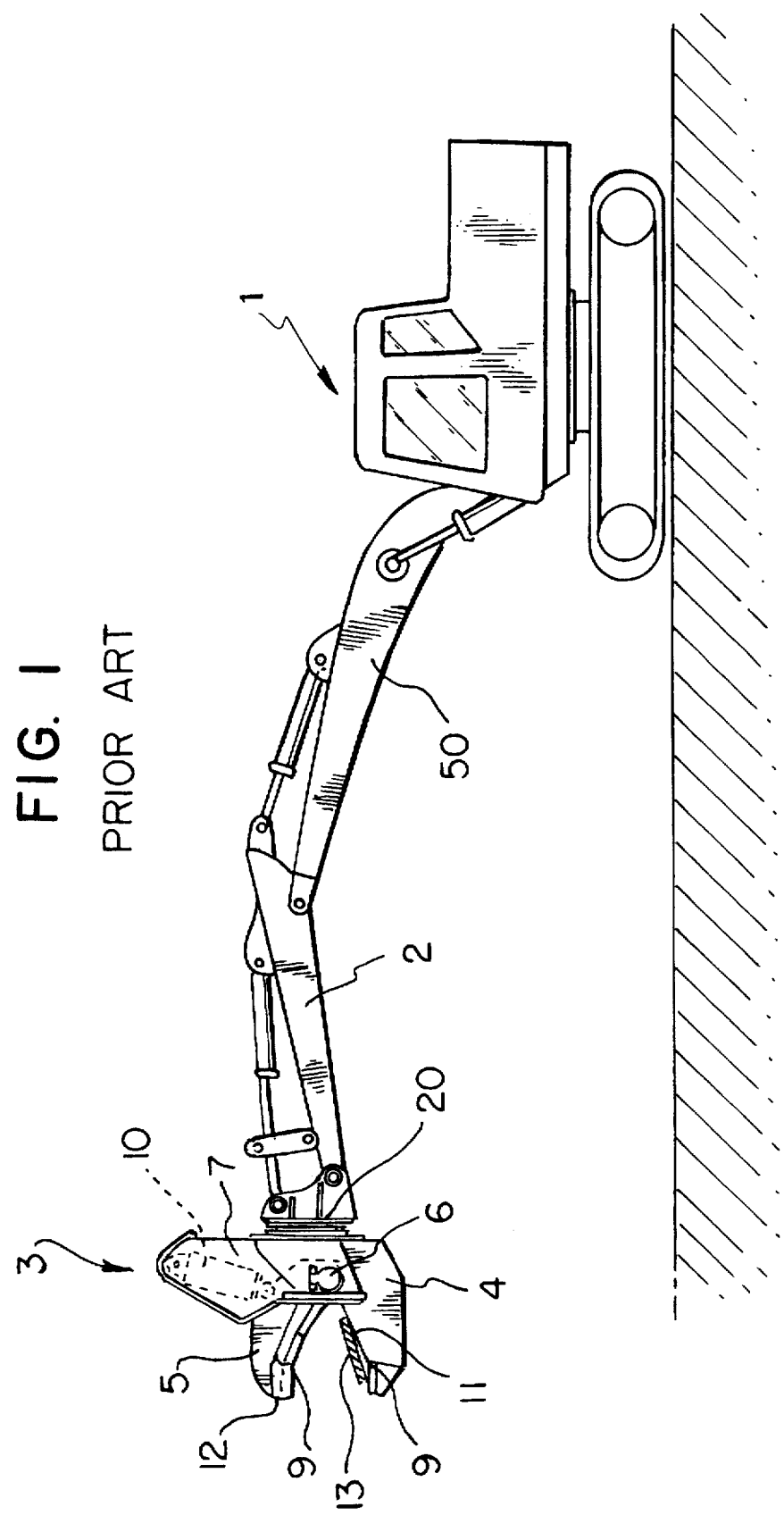
FIG. 1 is a side view of a power shovel according to the prior art.
Figure 2:
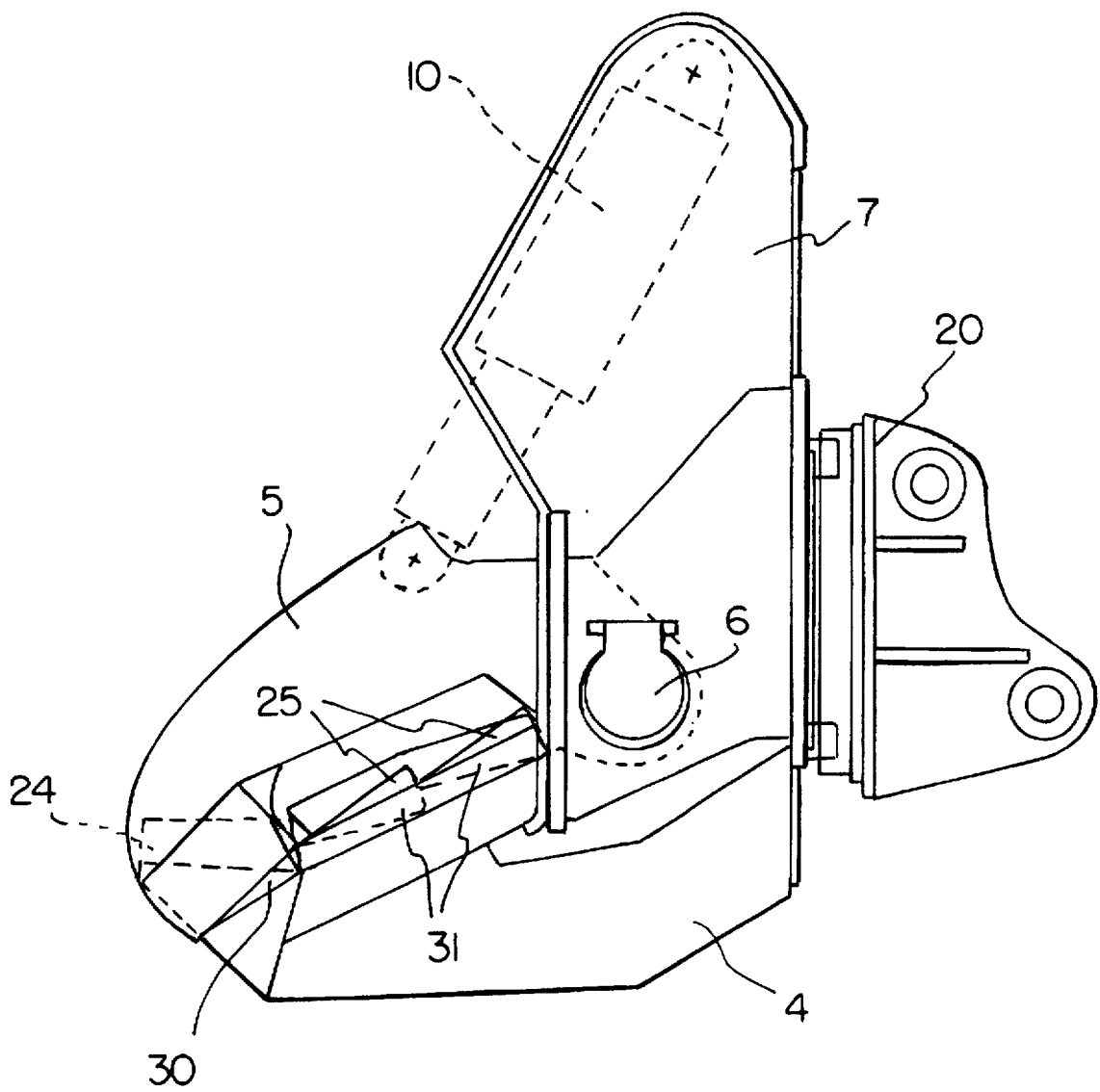
FIG. 2 is a side view of a steel shearing machine according to the prior art.
Figure 3:
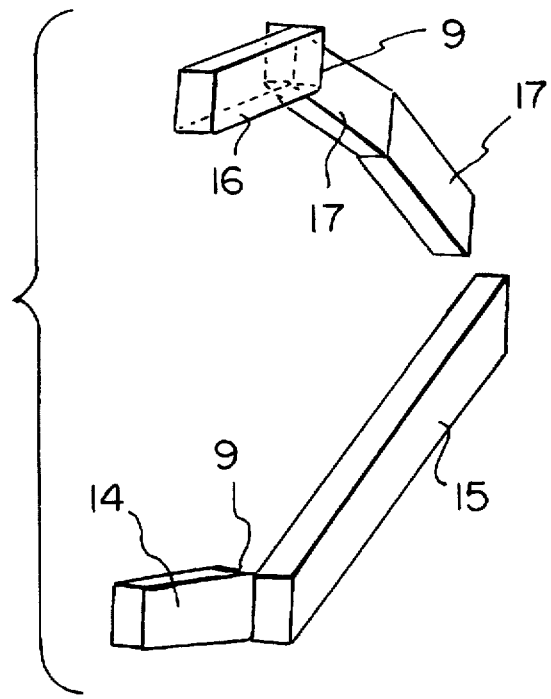
FIG. 3 is a perspective view of shearing blades of the prior-art shearing machine of FIG. 2.
Figure 4:
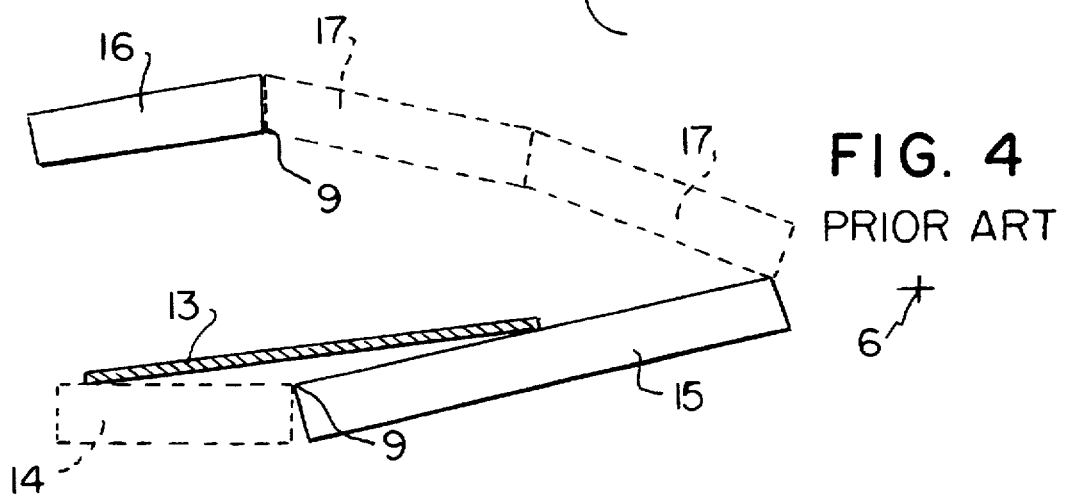
FIG. 4 is a side view of the shearing blades of FIG. 3 before beginning of shearing.
Figure 8:
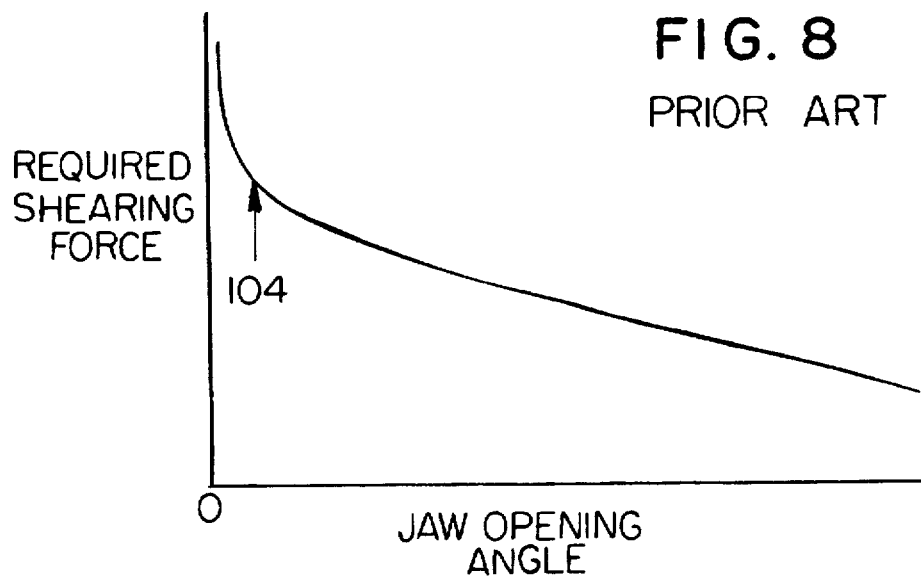
FIG. 8 is a curve showing the increase in required shearing force as the jaws of the shearing machine of FIG. 2 are closed.
Figure 5:
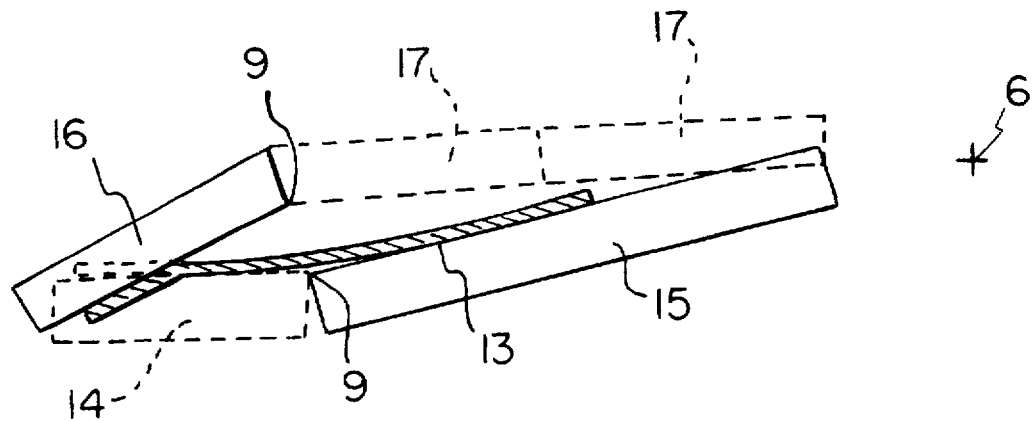
FIG. 5 is a side view of the shearing blades of FIG. 3 at the beginning of shearing.
Figure 6:
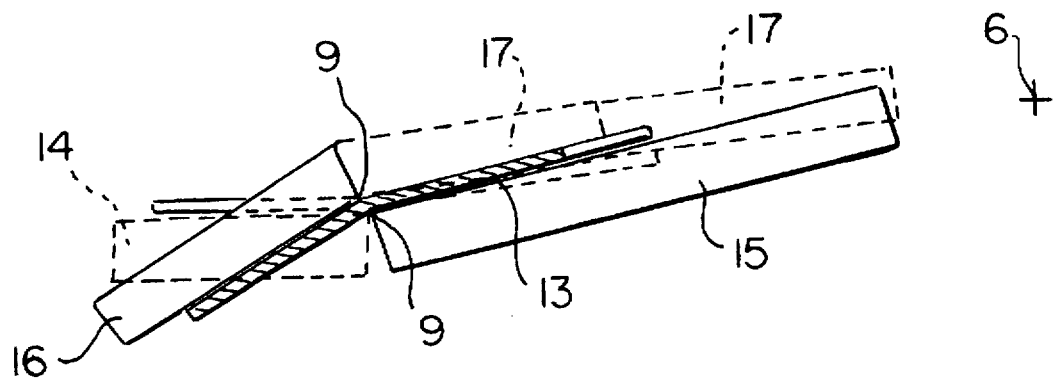
FIG. 6 is a side view corresponding to FIG. 5, but at a later stage of shearing.
Figure 7:
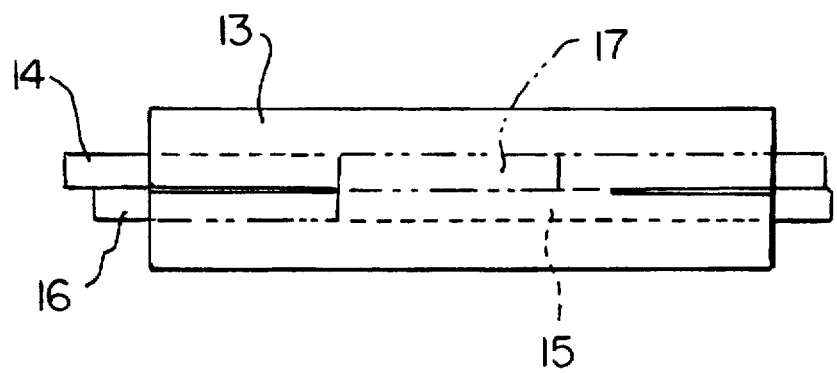
FIG. 7 is a top view of the shearing blades of FIG. 3 illustrating the transverse displacement of portions thereof for avoiding jaw spreading.
Figure 9:
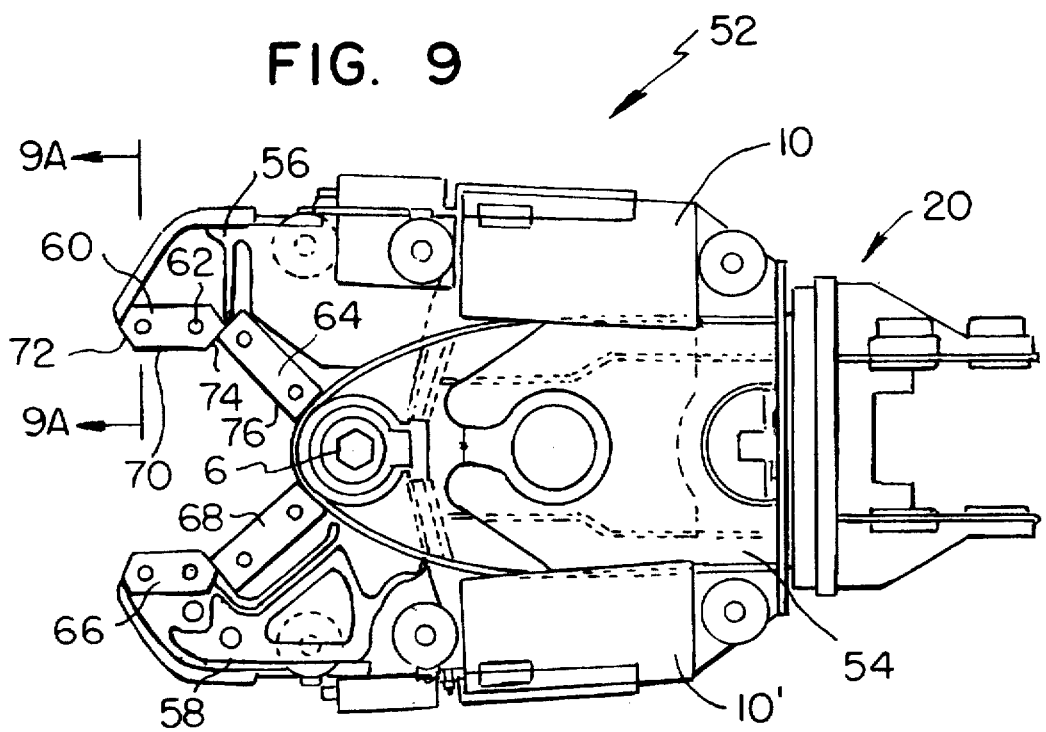
FIG. 9 is a side view of the jaws of a shearing machine according to an embodiment of the invention with the jaws in the open position.

Referring to FIG. 9, a shearing apparatus, shown generally at 52, includes a frame 54, rotatable on swivel joint 20. An upper jaw 56 and a lower jaw 58 are rotatably mounted on a common support shaft 6. A first hydraulic cylinder 10 is mounted between frame 54 and upper jaw 56 for rotating upper jaw 56 about support shaft 6. A second hydraulic cylinder 10' is mounted between frame 54 and lower jaw 58 for rotating lower jaw 58 about support shaft 6. When hydraulic cylinders 10 and 10' are extended, upper and lower jaws 56 and 58 are moved from the open position shown to a closed position.

Upper jaw 56 includes a leading shearing blade 60 mounted thereto using, for example, mounting bolts 62. A trailing shearing blade 64 is mounted on upper jaw 56 inwardly of leading shearing blade 60. Lower jaw 58 includes a leading shearing blade 66 and a trailing shearing blade 68 positioned in opposition to corresponding elements on upper jaw 56.

The shearing plane (not shown) of shearing apparatus 52 may be a single plane, in which leading and trailing shearing blades on each jaw are aligned with each other, or may be two offset planes, in which leading and trailing shearing blades on each jaw are displaced transversely. Transverse displacement permits one pair of opposing blades to generate transverse jaw spreading force in one direction, while the other pair of opposing blades generate transverse jaw spreading force in the opposite direction. These oppositely directed jaw spreading forces prevent jaw spreading from occurring. For the present description, it is assumed that the shearing plane is a single plane.

It is important in maintaining a reasonable shearing force requirement that the shearing angles between opposing blades, at the point where shearing is taking place, be maintained as large as possible.

As disclosed in my prior patent application, the concave outward shapes of the shearing edges of the shearing blades is important in positioning the material to be cut, as well as to maintain as large a shearing angle as possible between opposed shearing blades. However, because the shearing blades of the prior art are of generally rectangular shape, the adjacent ends of the leading and trailing shearing blades do not fit together closely. Instead, a gap or clearance exists between the ends.

Upper and lower leading shearing blades 60 and 66 are hexagonal in shape, whereas upper and lower trailing shearing blades 64 and 68 are generally square in shape. The hexagonal shape is symmetrical about a longitudinal line passing through bolts 62, as well as symmetrical about a vertical center line positioned between bolts 62.

Upper and lower leading shearing blades 60 and 66 are preferably identical, thus the following description directed to upper leading shearing blade 60 is taken as a description of both.

As installed, leading shearing blade 60 includes two active shearing edges. A main shearing edge 70 is disposed parallel to the longitudinal axis. An auxiliary shearing edge 72 is disposed at the tip of leading shearing blade 60 at an angle to main shearing edge 70. The angle between shearing edges 70 and 72 is a contributor to the efficient shearing performed by shearing apparatus 52, as will be explained. A downward-facing relief edge 74 is located at the inward end of main shearing edge 70. Relief edge 74 is inclined at the same angle to main shearing edge 70 as is true for auxiliary shearing edge 72.

Figure 9A:
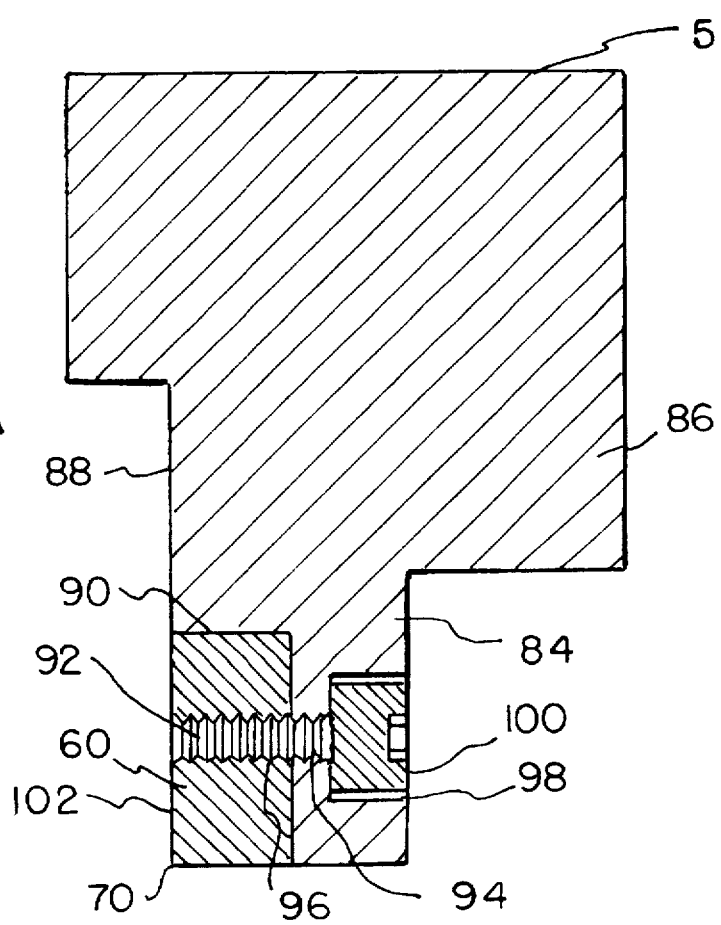
FIG. 9A is a cross section taken along the line A—A in FIG. 9.

Referring now to FIG. 9A, upper jaw 5 includes a generally rectangular web 84 extending downward from a main body 86. A shearing face 88 of web 84 includes a generally rectangular recess 90 in its extreme lower edge. Leading shearing blade 60 is retained in recess 90 by two bolts 92, only one of which is shown in FIG. 9A, each passing through a hole 94 in web 84 and engaging threads in a threaded hole 96 in leading shearing blade 54. A countersink 98 in web 84 protects a head 100 of bolt 92. An outer face 102 of leading shearing blade 54 is coplanar with shearing face 88.

In the position shown, one of the corners of the rectangular cross section of leading shearing blade 60 functions as main shearing edge 70. It would be clear to one skilled in the art that, by suitable rotation of leading shearing blade 60, any of the sides of shearing blade 60 may be brought into the position to serve as main shearing edge 70.

Returning now to FIG. 9, when leading shearing blade 60 is rotated to reposition its corners to function as main shearing edge 70, corresponding auxiliary shearing edges 72 and relief edges 74 are also brought into working positions.

Trailing shearing blade 64 is generally rectangular in outline, with a rectangular cross section. A leading end of trailing shearing blade 64 fits flat against a portion of relief edge 74, preferably with little or no gap or clearance therebetween. In the preferred embodiment, the angle of relief edge 74 produces a desired amount of concavity in the assembly consisting of leading shearing blade 60 and trailing shearing blade 64. Trailing shearing blade 64 is displaced outward in the vertical direction so that a portion of relief edge 74 extends below it. Due to its rectangular cross section, any one of the four edges of trailing shearing blade 64 can be brought into position as the active shearing edge 76.

Figure 10A:
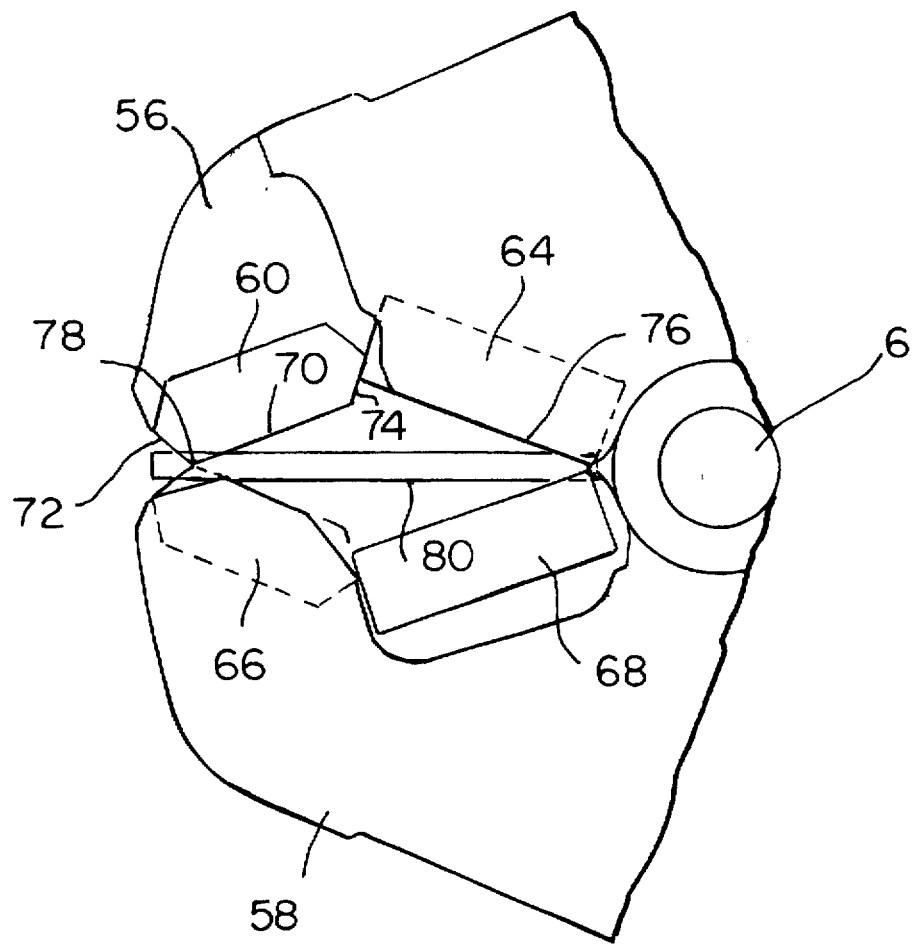
FIG. 10a is a side view of the jaws of the shearing machine of FIG. 9 at the beginning of a shearing operation.

Referring now to FIG. 10a, as upper jaw 56 and lower jaw 58 are rotated about support shaft 6 toward the closed position, a point 78 of leading shearing blades 60 and 66 contact opposite sides and begin to penetrate a sheet of material 80 to be cut. The included angles in points 78 ensure a relatively steep shearing angle both outside and inside points 78. At about this same time, rear ends of trailing shearing blades 64 and 68 begin to cut forward at the rear edge of material 80.

Figure 10B:
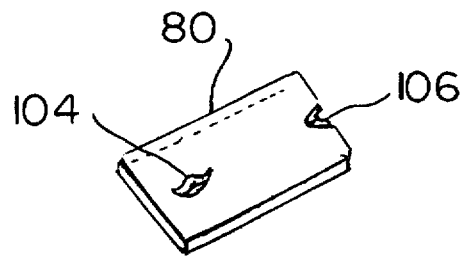

Referring now to FIG. 10b, material 80 is shown with shearing progressed to the point illustrated in FIG. 10a. A pair of dimples 104, one upward and one downward, are formed in material 80 by penetration of points 78. In addition, a forward directed slit 106 is formed extending a short distance inward from the rear edge of material 80 by the engagement of rear ends of the two trailing shearing blades 64 and 68.

Figure 11A:
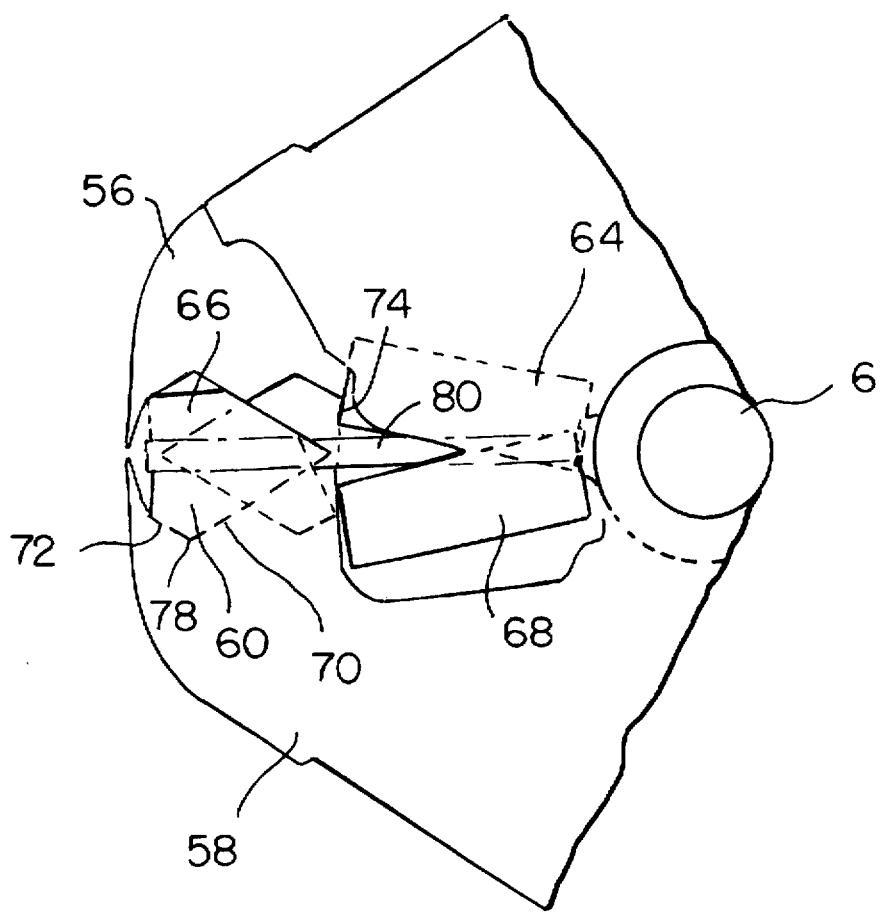
FIG. 11a is a side view of the jaws of the shearing machine of FIG. 9 at an intermediate point in the shearing operation.

Referring now to FIG. 11a, shearing has progressed sufficiently that auxiliary shearing edge 72 has passed completely through material 80 and shearing has progressed along the entire length of main shearing edge 70 and past the end of main shearing edge 70 to the relief edges 74. Due to the included angle forming relief edges 74, at this time, relief edges 74 of the upper and lower leading shearing blades 60 and 66 move past each other without performing shearing. This almost completely unloads shearing forces from leading shearing blades 60 and 66, thereby permitting the application of all of the force produced by hydraulic cylinders 10 and 10' on continuing shearing by trailing shearing blades 64 and 68.

Figure 11B:
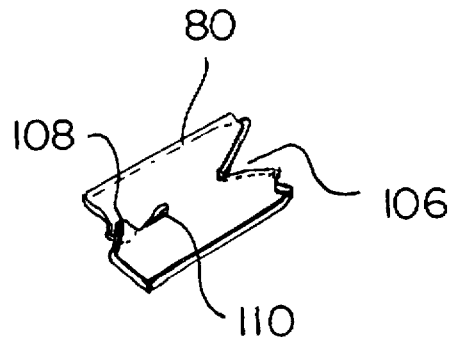

Referring now to FIG. 11b, material 80 is shown with shearing progressed to the condition shown in FIG. 11a. The dimple initially formed at points 78 has been expanded forward by auxiliary shearing blade 72 to form an open cut 108 formed in the forward direction, and a rearward slit 110. By this time, slit 106, formed by trailing shearing blades 64 and 68 has not progressed very far. In addition, the shearing angle between trailing shearing blades 64 and 68 is being reduced because of the rotation of the two jaws 56 and 58 toward each other. Thus, the reduction in required shearing force provided by relief edges 74 is valuable in directing all of the force the trailing shearing blades 64 and 68.

Figure 12A:
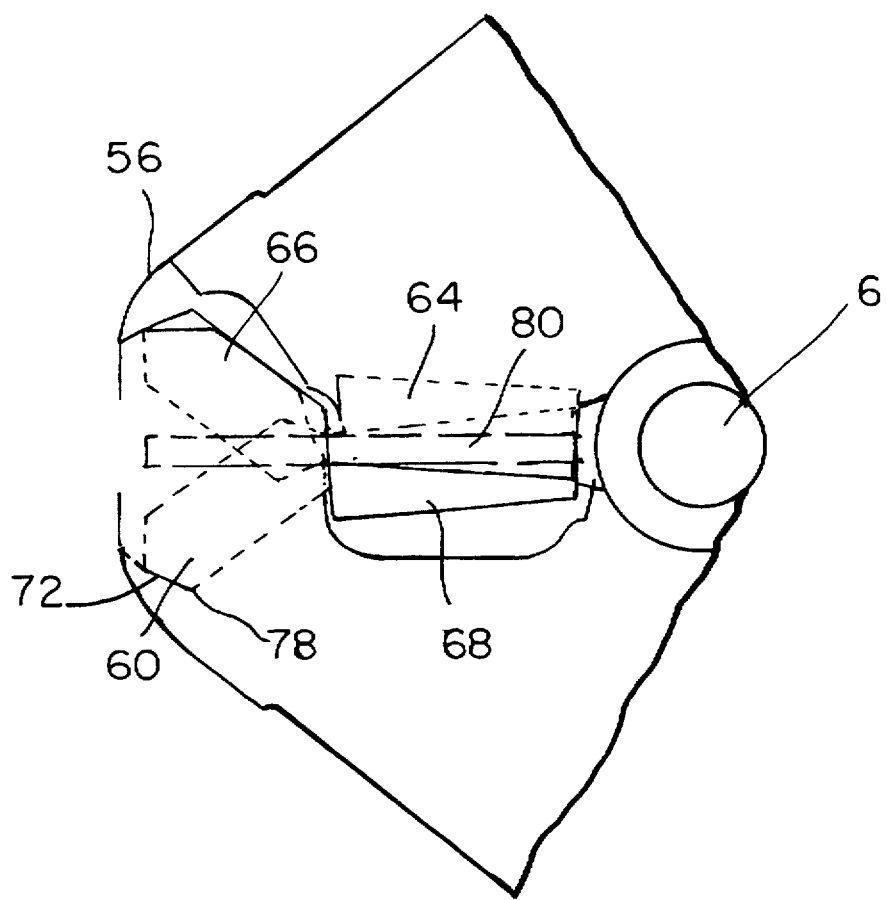
FIG. 12a is a side view of the jaws of the shearing machine of FIG. 9 at the completion of the shearing operation.
Figure 12B:
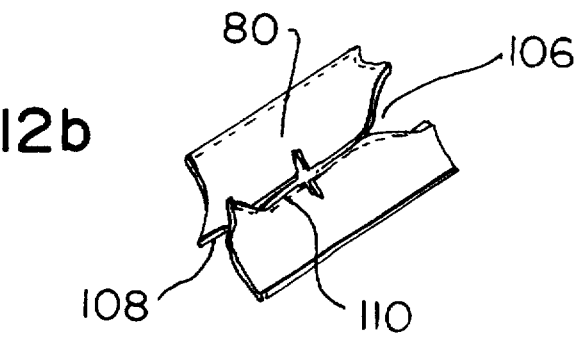

Referring now to FIGS. 12a and 12b, shearing has advanced fully forward by trailing shearing blades 64 and 68 to extend slit 106 forward to meet slit 110. Material 80 is thus severed. During this latter activity, slit 110 is not extended rearward since leading shearing blades 60 and 66 do not engage each other. The presence of relief edges 74 prevents material 80 from moving forward while shearing progresses.

Figure 13:
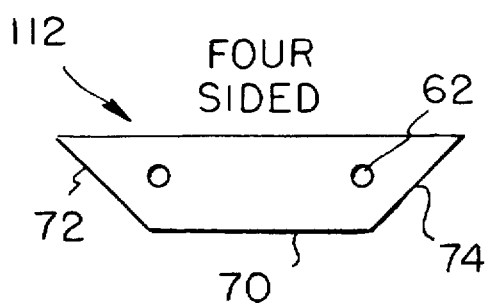
FIG. 13 is a top view of a four-sided shearing blade according to an embodiment of the invention.

Although the foregoing disclosure is directed to leading shearing blades having six sides, hexagons, other geometric shapes may be employed to arrive at the same result. Referring to FIG. 13, a four-sided shearing blade 112 includes main shearing edge 70, auxiliary shearing edge 72 and relief edge 74, as in the prior embodiment, but lacks the other potential shearing edges which the prior embodiment permitted to be moved into active locations. That is, the embodiment of FIG. 13 may be rotated to interchange relief edge 74 with auxiliary shearing edge 72, but the edges on the side of the shearing blade opposite to main shearing edge 70 are not available. Thus, although the embodiment of FIG. 13 will function as described for the prior embodiments, a certain amount of efficiency is sacrificed through its use. However, the embodiment of FIG. 13 must be considered to be within the scope of the invention.

Figure 14:
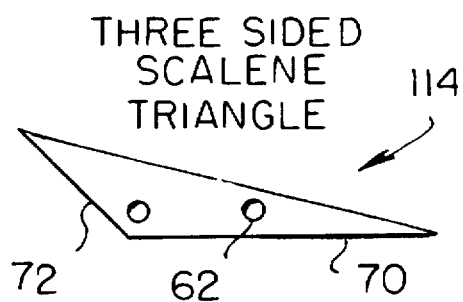
FIG. 14 is a top view of a triangular shearing blade according to an embodiment of the invention.

Referring to FIG. 14, a triangular shearing blade 114 includes main shearing edge 70 and auxiliary shearing edge 72, but omits relief edge 74, and all other functional edges of prior embodiments.

Figure 15:
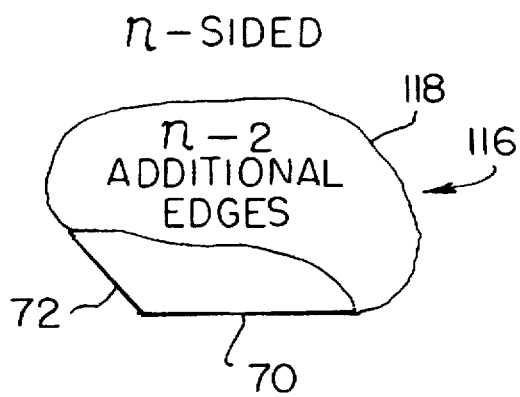
FIG. 15 is a top view of an n-sided shearing blade according to an embodiment of the invention.

Referring to FIG. 15, an n-sided shearing blade 116 includes a main shearing edge 70 and an auxiliary shearing edge 72, as in prior embodiments. An indefinite shape 118 joins outer ends of main shearing edge 70 and auxiliary shearing edge 72. Indefinite shape 118 may have three edges to form leading shearing blade 60, two edges to form four-sided shearing blade 112, one edge to form triangular shearing blade 114, or it may have more than three edges.

Figure 16:
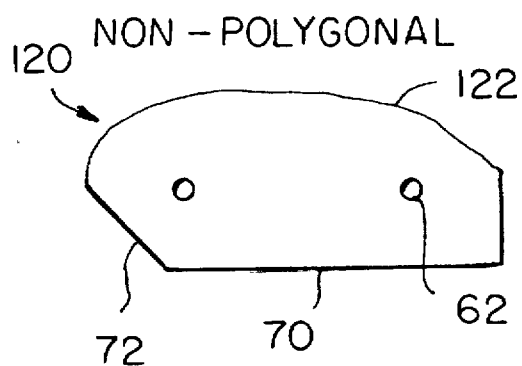
FIG. 16 is a top view of a non-polygonal shearing blade according to an embodiment of the invention.

FIG. 16 shows a non-polygonal shearing blade 120 in which outer ends of main shearing edge 70 and auxiliary shearing edge 72 are connected by a structure which includes a curved edge 122. Due to the presence of curved edge 122, non-polygonal shearing blade 120 is not a polygon, although it is capable of functioning in the manner described above. The particular embodiment shown lacks a relief edge 74, but a relief edge could be added without substantially changing the properties and function.

Figure 17:
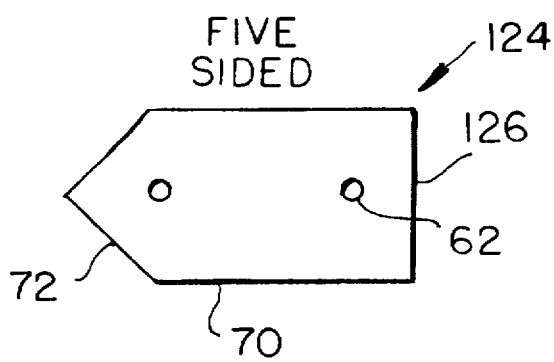
FIG. 17 is a top view of a five-sided shearing blade according to an embodiment of the invention.

Referring to FIG. 17, a five-sided shearing blade shearing blade 124 includes main shearing edge 70 and auxiliary shearing edge 72, as in prior embodiments. However, in this embodiment, an end surface 126 extends normal to main shearing edge 70, thereby omitting a relief edge 74 of some prior embodiments.

Figure 18:
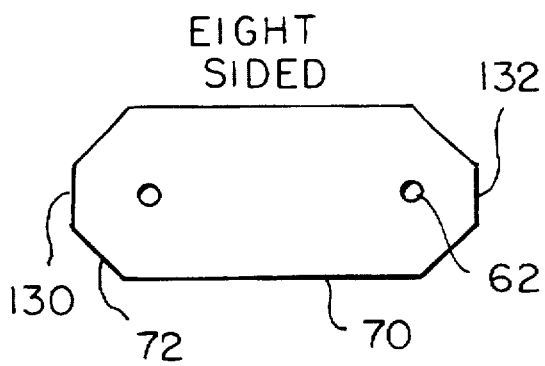
FIG. 18 is a top view of an eight-sided shearing blade according to an embodiment of the invention.

Referring to FIG. 18, an eight-sided shearing blade 128 is formed by cutting off tips of the embodiment of the invention shown in FIGS. 9, 10a, 11a and 12a, to form flat ends 130 and 132. Flat ends 130 and 132 interfere very little, if at all, with the functioning of the present invention.

The embodiment of eight-sided shearing blade 128 could be further modified by chamfers at the junctions of main shearing edge 70 with auxiliary shearing edge 72 and relief edge 74, as well as at the junctions of non-functioning edges.

Boiled down to its essence, the present invention relies on the presence of at least a main shearing edge and an auxiliary shearing edge angled with respect to each other at their junction so that both of these shearing edges are active in performing shearing at some stage in the shearing operation. It is preferable that the included angle between the main shearing blade and the auxiliary shearing blade be greater than 90 degrees.

In a further embodiment, a third shearing blade, which may have a rectangular or other polygonal outline, is added inward of the trailing shearing blade of the described embodiment. All such arrangements should be considered to fall within the scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A shearing apparatus comprising:

an upper jaw;

a first leading shearing blade on said upper jaw;

a first trailing shearing blade on said upper jaw;

said first leading shearing blade having a first outline;

said first outline forming a first main shearing edge and a first auxiliary shearing edge at a forward end thereof;

said first main shearing edge and said first auxiliary shearing edge forming a first angle therebetween;

said first trailing shearing blade abutting a trailing end of said first outline;

a lower jaw;

a second leading shearing blade on said lower jaw;

a second trailing shearing blade on said lower jaw;

said second leading shearing blade having a second outline;

said second outline forming a second main shearing edge and a second auxiliary shearing edge at a forward end thereof;

said second main shearing edge and said second auxiliary shearing edge forming a second angle therebetween;

said second trailing shearing blade abutting a trailing portion of said second outline;

said first and second angles being greater than 90 degrees; and means for permitting rotation of at least one of said upper jaw and said lower jaw, whereby shearing engagement between shearing blades on said upper and lower jaws is enabled.

2. A shearing apparatus according to claim 1, further comprising:

said first outline being generally hexagonal;

said second outline being generally hexagonal; and said shearing engagement includes engagement between said first and second auxiliary shearing edges and said first and second main shearing edges during a shearing operation.

3. A shearing apparatus according to claim 1, further comprising:

said first leading shearing blade including a first relief edge at a trailing portion thereof;

said second leading shearing blade including a second relief edge at a trailing portion thereof; and said first relief edge and said second relief edge being generally tangential to said rotation, whereby said first relief edge and said second relief edge move past each other without performing shearing, whereby shearing forces are transferred to other shearing elements.

4. A shearing blade for a shearing apparatus comprising:

a main shearing edge;

an auxiliary shearing edge adjacent a first end of said main shearing edge;

said main shearing edge and said auxiliary shearing edge forming a penetration point therebetween;

said main shearing edge and said auxiliary shearing edge defining a first included angle therebetween;

said first included angle being greater than 90 degrees;

a relief edge adjacent a second end of said main shearing edge; said relief edge and said main shearing edge defining a second included angle therebetween;

said second included angle being greater than 90 degrees;

said shearing blade being positioned on said shearing apparatus such that said penetration point between said main shearing edge and said auxiliary shearing edge contacts an object to be sheared before said relief edge contacts said object;

said relief edge passing said object without shearing said object, thereby unloading any shearing stress on said shearing blade as said relief edge passes said object;

said shearing blade being a hexagon;

said main shearing edge and said auxiliary shearing edge of said first included angle forming a first apex of said hexagon;

said relief edge and said main shearing edge of said second included angle forming a second apex of said hexagon;

said hexagon including first and second axes of symmetry;

third and fourth apices of said hexagon being at a side of one of said axes of symmetry opposing said first apex and said second apex; and said third and fourth apices having included angles equal to included angles of said first apex and said second apex.

* * * * *